United States Patent [19]
Metzger

[11] 3,881,712
[45] May 6, 1975

[54] DAMPER MECHANISM
[75] Inventor: Paul T. Metzger, Rochester, N.Y.
[73] Assignee: Sybron Corporation, Rochester, N.Y.
[22] Filed: Jan. 11, 1974
[21] Appl. No.: 432,520

[52] U.S. Cl. ............................................. 267/154
[51] Int. Cl. ............................................. F16f 1/16
[58] Field of Search ....... 267/159 V, 154, 113, 136; 200/81, 81.4, 81.6

[56] References Cited
UNITED STATES PATENTS
2,614,184  10/1952  Robinson ........................... 267/113
2,777,032  1/1957   Burch ................................. 267/159
3,210,497  10/1965  Schwartz ............................ 267/159
3,747,914  7/1973   Thrasher ............................ 267/136

Primary Examiner—James B. Marbert
Attorney, Agent, or Firm—Theodore B. Roessel; Charles C. Krawczyk; J. Stephen Yeo

[57] ABSTRACT

A pivotal damper for providing a damping function for lever mechanisms. The damper includes a flexible portion, and is secured to the lever mechanism so that the flexible portion extends through the pivotal axis of the lever mechanism wherein the pivot of the damper automatically corresponds to the pivot axis of the lever mechanism without any need for adjustments.

14 Claims, 5 Drawing Figures

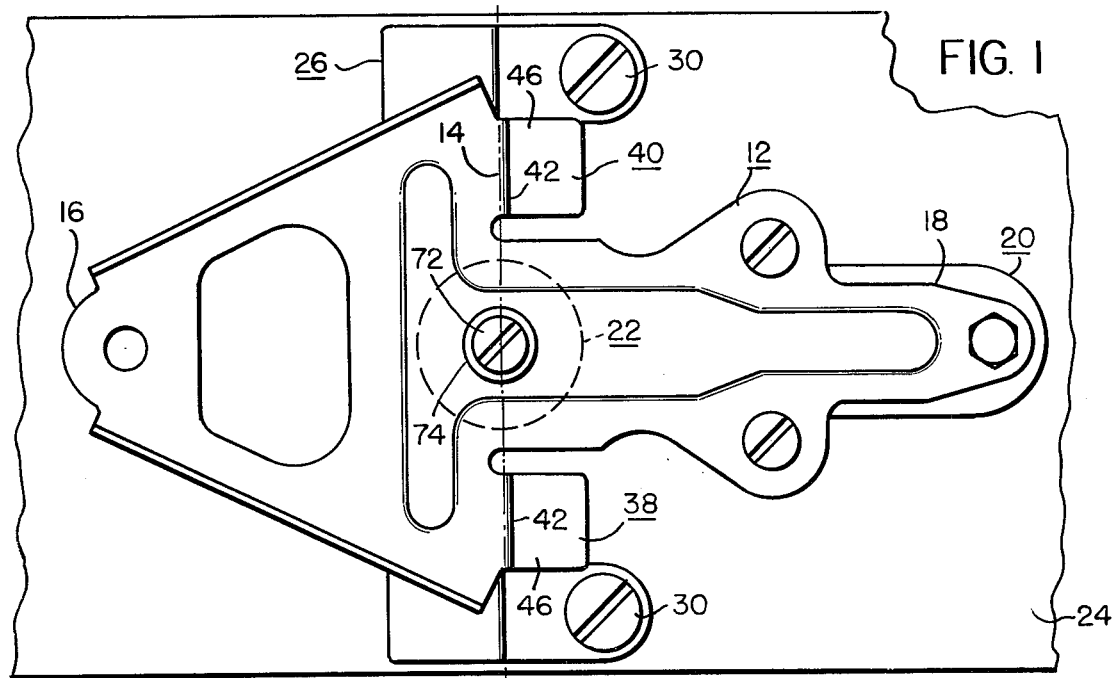
FIG. 1
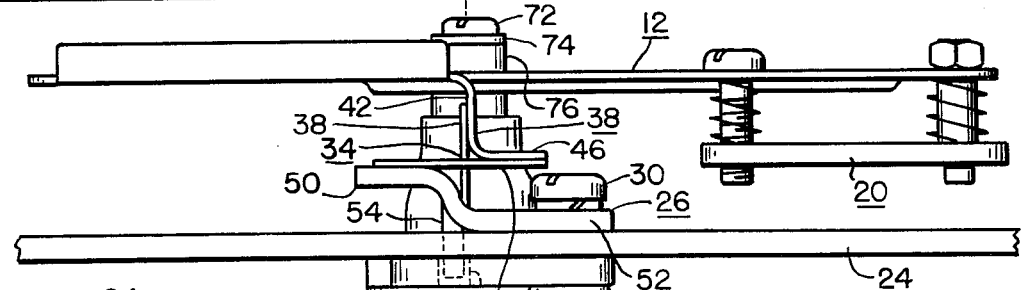
FIG. 2
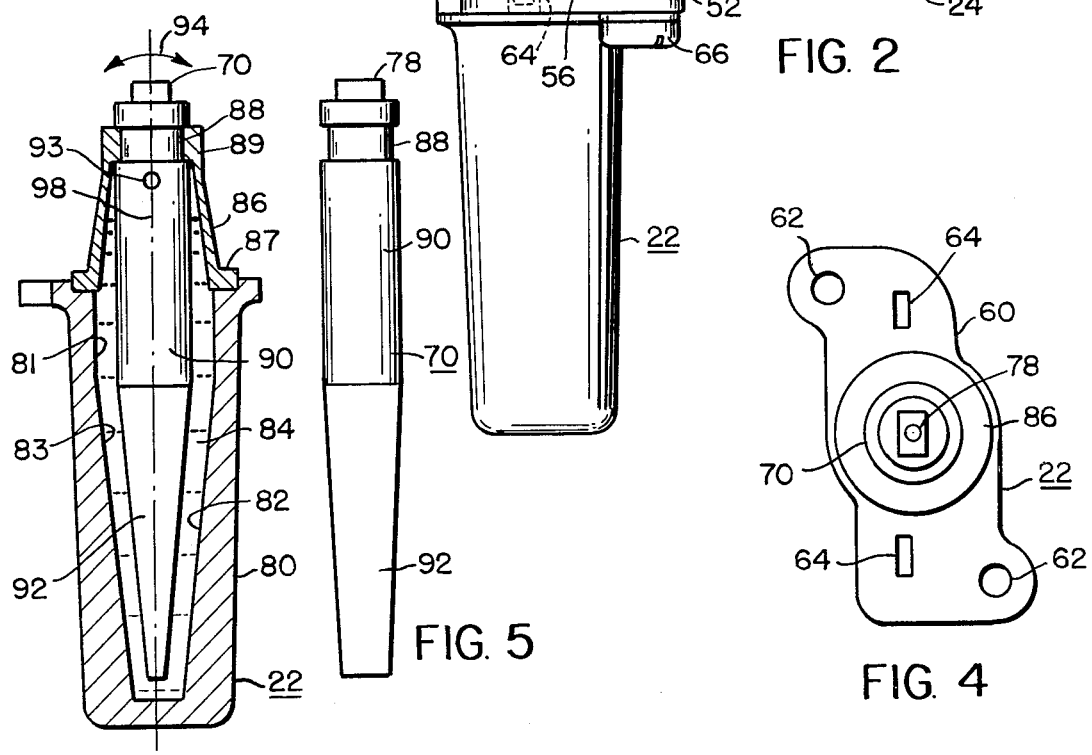
FIG. 3
FIG. 5
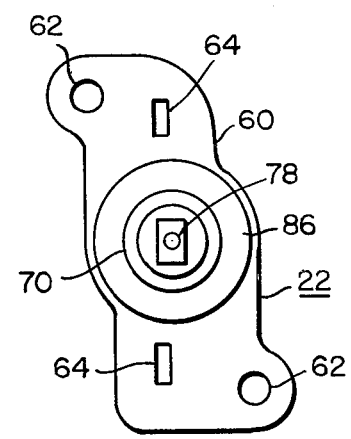
FIG. 4

DAMPER MECHANISM

BACKGROUND OF THE INVENTION

This invention pertains to damper mechanisms in general, and more particularly to pivotal damper mechanisms for lever systems.

In various types of control systems, lever mechanisms are used to provide a desired control function or conversion. Such lever mechanisms are often found in electro-pneumatic transducers for converting electrical signals into pneumatic signals, or vice versa. Because of the low level signals involved and the desired degree of accuracy, the lever mechanisms in such control instruments are generally made of a light weight structure. However, the lever mechanisms are of a rugged construction so that the control instruments can be mounted at almost any appropriate location, such as for example on pipes, valves, etc. Quite often, the control instruments are subject to a great deal of vibration, which in turn tends to create noise in the electrical and pneumatic signals involved. The effect of the vibration, and the corresponding signal noise problems, can be reduced to an acceptable level by proper damping of the lever mechanisms.

Because of the low level signals involved and the low mass of lever mechanisms, the damper is required to provide a low level type of damping function that will eliminate problems due to vibration and the like but will not effect the desired response of the instrument. In addition to the foregoing the control instruments are also of often located in areas that experience wide fluctuations in temperatures. A damper used with the lever mechanisms should not, as a result of the temperature changes, introduce extraneous forces into the mechanisms that will offset the force balance of the lever mechanisms and thereby introduce undesirable errors. In addition to the foregoing, because of the variety of potential applications, it is highly desirable that the damper includes a construction so that it can be positioned in any orientation without affecting the operation and balance of the control instruments.

Control instruments of this type often also include a span adjustment, a zero bias adjustment, and a nozzle alighment adjustment. An electro-pneumatic transducer of this type is disclosed in a copending patent Ser. No. 432,511 filed Jan. 11, 1974 for Wayne D. Mitchell and Paul T. Metzger, entitled "Electro-Pneumatic Transducer." With these various adjustments involved, the damper should not affect the setting of the adjustments, nor should the damping effect vary with changes of the adjustments. In addition to the foregoing, it is highly desirable that the damper be of the type that is readily connectable to the lever mechanism without the need for any adjustments thereby reducing the cost involved in the assembly of the transducers, or involved in the replacement of the damper in the event a failure.

It is therefore an object of this invention to provide a new and improved pivotal damping mechanism.

It is also an object of this invention to provide a new and improved pivotal damping mechanism for lever mechanisms and the like.

It is also an object of this invention to provide a new and improved damping mechanism for lever mechanisms and the like that is readily attachable to the lever mechanisms without the need for any adjustments.

It is also another object of this invention to provide a new and improved pivotal damper for lever mechanism that does not upset the force balance of the lever mechanism due to temperature changes.

It is still a further object of this invention to provide a new and improved pivotal damping mechanism for connection to lever mechanisms and the like that does not effect the various span, zero bias, and nozzle adjustments involved in the transducers.

It is still a further object of this invention to provide a new and improved pivotal damper mechanism that can be used in any orientation.

BRIEF DESCRIPTION OF THE INVENTION

A damper for a lever mechanism wherein a lever beam is mounted for pivotal movement about a pivotal axis. Damping means, including a flexible portion, is secured to the lever beam so that the flexible portion extends through the pivot axis of the lever beam wherein the damping means automatically assumes the pivot axis of the lever beam.

In accordance with a further feature of the invention, the damper includes a rigid enclosure formed with a cavity having a fluid contained therein. A paddle extends through the opening and into the fluid. A flexible seal extends from the opening in the enclosure and supports the paddle in the fluid. The flexible seal functions as a variable pivot for controlling the pivotal movement of the paddle within the cavity. The arrangement is such, that the damper enclosure can be fastened to a base of the lever mechanism and the free end of the paddle is attached to the lever mechanism so that the pivot axis of the lever mechanism extends through the flexible seal, wherein the paddle, in response to the movement of the lever mechanism, pivots about the pivot axis of the lever mechanism. The damper can be secured to the lever mechanism without the need for any adjustments to assure that the damper provides the desired damping effect, and without detrimentally effecting the operation of the lever mechanism or its span, zero bias, etc. adjustments.

Since the damper mechanism is a sealed unit, it can be used in any orientation. Therefore, in accordance with another feature of the invention, the mass of the paddle can be selected and its center of gravity located relative to the pivot axis, so that a static balance of the lever mechanism can be achieved, wherein the operation of the entire transducer is position, or orientation, insensitive.

BRIEF DESCRIPTION OF THE INVENTION

FIG. 1 is a top view of a damped lever mechanism including the invention.

FIG. 2 is a side view of the damped lever mechanism of FIG. 1.

FIG. 3 is a sectional side view of the damper in the damped lever mechanism of FIGS. 1 and 2.

FIG. 4 is a top view of the damper of FIG. 3.

FIG. 5 is another side view of a damper paddle included within the damper mechanism of FIG. 3.

DETAILED DESCRIPTION OF THE INVENTION

As illustrated in FIGS. 1 and 2, a lever beam 12 is mounted for pivotal movement about a pivot axis designated by the dashed line 14. One end 16 of the lever mechanism can be coupled to an electromagnetic transducer, while the other end 18 can be coupled to a nozzle-baffle arrangement, to function as an electro-pneumatic transducer of the type disclosed in the above-mentioned copending patent application Ser. No. 432,511. An adjustable baffle mechanism 20 is provided for setting the operation of the baffle-nozzle assembly as described in greater detail in the above-mentioned copending patent application Ser. No. 432,511. A zero bias adjustment (not shown) can also be connected to the lever beam 12 to set the mechanism to a balanced position for a zero signal input condition. A zero bias adjustment is disclosed in the above-mentioned copending patent application Ser. No. 432,511, and also in a copending patent appliation Ser. No. 432,521 filed on Jan. 11, 1974 for Paul T. Metzger and Wayne D. Mitchell and entitled "Adjustment Mechanism." The span adjustment for the lever mechanism can be provided by means of adjusting the position of the nozzle assembly relative to the baffle plate mechanism 20, as disclosed in the above-mentioned copending patent application Ser. No. 432,511 or by adjusting the electromagnetic transducer, as disclosed in a U.S. Pat. No. 3,009,084 issued on Nov. 14, 1961 to C. G. Balliett and entitled "Electromechanical Transducer." A damper 22, in accordance with the invention, is secured to the lever mechanism base 24 and the lever beam 12 in an arrangement wherein the damper does not effect any of the settings of the span, zero bias, and/or nozzle-baffle adjustments, is position or orientation insensitive in its operation and does not need any adjustments to conform with the pivotal movement of the lever beam 12.

The lever beam 12 is mounted to the base 24 by a C-shaped bracket 26, the screws 30, and a pair of leaf spring assemblies 34. The bracket 26 and the leaf spring assemblies 34 are located on opposite sides of the damper 22. A pair of projections 38 and 40 extend from the lever beam 12. The projections 38 and 40 include a leg 42 and a foot 46 extending generally normal to each other. The bracket 26 has generally S-shaped ends with portions 50 and 52 thereof lying parallel to their respective extension foot 46. In addition, the bracket 26 includes two tabs 54 that extend therefrom through the base 24 to serve as an alignment means for mounting the damper 22 as will be discussed in greater detail in a later portion of the specification. Each of the spring assemblies 34 are formed of two leaf springs 56 and 58 that are disposed generally normal to each other. The foot 46 of each lever projection 38 and 40 is secured to the respective bracket portion 50 via the leaf spring 56. The leg 42 of each extension 38 and 40 is secured to the respective tab 54 of the bracket 26 via the leaf spring 58. The points at which the leaf springs 56 and 58 cross define the pivot axis of the lever beam 12. The pivot axis 14 extends through the cross-over points of the springs 56 and 58 of both the spring assemblies 34. The pivotal mounting of the lever beam 12 is disclosed in greater detail in the above-mentioned copending patent application Ser. No. 432,511.

As illustrated in FIG. 4, the damper 22 includes a flat base 60 that is formed with a pair of aperatures 62 and a pair of slots 64 extending through the base 60. When mounting the damper 22 to the base 24, the slots 64 align with the tabs 54 of the bracket 26. A pair of screws 66 extend through the aperatures 62 and secure the damper 22 to the base 24. A pivotal paddle or post 70, in the damper 22 is secured to the lever beam 12 by the use of a screw 72 that extends through a washer 74 and a collar 76 into a threaded aperature 78 formed in the end of the paddle 70. The damper 22 includes an elongated rigid housing 80 formed with an elongated cavity 82 having a cylindrical shaped section 81 with an opening, and a converging closed section 83 all of which is filled with a fluid 84, such as for example a silicone liquid. A flexible seal 86 extends between the opening to the cavity 82 and the paddle 70 in an arrangement wherein a fluid tight seal is provided between the enclosure 80 and the paddle 70. The end 87 of the flexible seal fits with the annular recess in the base 60 adjacent the cavity opening and is cemented thereto. The end 89 of the flexible seal fits within a groove formed in the paddle 70.

The groove 88 has a diameter that is slightly larger than the undeformed diameter of the flexible seal 89 that engages the groove 88. When assembled, as illustrated, the flexible seal 89 forms a compression seal with the groove 88. The lever beam 12 is formed with a rectangular shaped aperature (not shown) having the same configuration as the top of the paddle 70 (as viewed in FIG. 4). The compression type seal between the flexible seal 89 and the groove 88 provides a slip type fitting that allow the rotational movement of the paddle 70 (relative to the flexible seal 89) for aligning the paddle top 78 relative to the aperature in the lever beam. The portion of the damper 22 between the paddle 70 and the flexible seal 86 is also filled with the silicone liquid leaving no air or voids inside the damper assembly. As a result, the paddle 70 is continuously immersed in the silicone fluid and therefor the damping effect of the damper 22 is insensitive to its position or orientation. The flexible seal 86 provides a variable pivot point for the damper 22 and also provides means for allowing for the expansion and contraction of the silicone fluid within the damper 22 due to temperature changes. The paddle 70 includes a cylindrical portion 90 and a wedge shape portion 92 extending therefrom wherein the width of the paddle (as viewed in FIG. 5) substantially less than the length, and the thickness of the wedge shaped portion 92 at the end of the paddle is substantially less than the width to optimize the damping action of the motion indicated by the arrows 94.

When the damper 22 is secured to the lever mechanism, the damper, through the use of the flexible seal 86, automatically assumes a pivot point that lies along the pivot axis 14. In the arrangement illustrated on FIGS. 1 and 2, the pivot point assumed by the damper 22 will lie within the circle 93 of FIG. 3. In response to a force applied to the paddle 70 in the direction of the arrows 94, the paddle 70 pivots within the the limits of the cavity 82. The silicone fluid resists the pivotal movement of the paddle 70 to provide the damping function. It should be noted, forces due to temperature are symetrically developed about the center line 98 of the paddle 70 with a resultant force on the center line that passes through the pivot axis 14. As a result, a moment summation of these forces about the pivot axis 14 is theoretically zero and therefore changes in temperature and the resulting expansion and contraction of the fluid will leave no appreciable effect on force balance operation of the lever mechanism.

The mass of the paddle 70 is selected, and its center of gravity located relative to the pivot point 93, so that a static balance is achieved between the portion of damper paddle 70 that extends on one side of the pivot axis 14 and the mass of the lever mechanism (such as the baffle mechanism 20 and the moving coil mechanism of an electromagnetic transducer) that extends on the other side of the pivot axis 14. A static balance is continously maintained regardless of the orientation of the lever mechanism making the mechanism position insensitive (i.e., can be operated in any orientation without an noticeable detrimental affect). Hence, the control instrument including the damped lever mechanism can be usually repositioned without any further readjustment of its operation.

The combination of the elongated paddle 70, the cavity 82 within the housing 80, and the flexible seal 86 supporting the paddle 70 within the fluid in the cavity 82, provides a damper arrangement that can be secured to a lever mechanism so that the flexible seal 86 is positioned within the pivot axis wherein the damper 22 automatically assumes the pivot axis of the lever mechanism as its pivot point. With this type of arrangement, there is no need to align the pivot of the damper with the pivot of the lever mechanism. The pivot of the damper will conform to the particular design of the lever mechanism without any adjustment. Because of the sealed structure of the damper 22, the damper can be used in any orientation. In addition to the foregoing, since the damper 22 accepts the pivot point of the lever beam 12, it does not effect any of the span, zero bias, and/or nozzle-baffle adjustments. The static balance provided by the damper 22 allows the lever mechanism to be used in any orientation. The damper 22, in the case of failure, can be simply replaced with another unit without the necessity of readjusting the operation of the transudcer. Furthermore, since the moment of summation of forces on the paddle 70 due to temperature changes approaches zero, the damper does not upset the force balance arrangement of the lever mechanism. It was found, that the damper 22, of the invention, provided an adequate damping effect on the disclosed lever mechanism to eliminate noise problems due to vibration and the like, and was effective over the wide range of temperature varations (−40°F to +200°F) without materially upsetting the force balance of the lever mechanism.

I claim:
1. A damper comprising:
   a rigid housing formed with a cavity and an opening to the cavity;
   a fluid contained within the cavity;
   a post extending through the opening into the fluid in the cavity, and
   a flexible seal extending from the opening in said enclosure supporting said post in said fluid, said flexible seal providing a pivot for controlling the pivotal movement of the post within the cavity.
2. A damper as defined in claim 1 wherein:
   said housing has an elongated shape with an elongated cavity formed therein, and
   said post has an elongated shape and extends from without the cavity, into the cavity, along the direction of the elongated shape for a major portion of the cavity.
3. A damper as defined in claim 2 wherein:
   said flexible seal supports the post at the end extending from the housing and allows for the expansion and contraction of the fluid within the cavity due to temperature changes.
4. A damper as defined in claim 3 wherein:
   said post is formed with a groove at the end extending from said housing;
   said housing is formed with a groove adjacent the cavity opening; and
   said flexible seal is connected between the post and housing grooves to provide a fluid tight seal.
5. A damper as defined in claim 4 wherein:
   the seal between the flexible seal and the post groove is a compression type seal wherein the post can be rotated relative to the flexible seal.
6. A damper as defined in claim 3 including:
   mounting means on said housing adjacent the opening for mounting said damper; and
   attachment means at the end of said post for connecting the post to a pivotal mechanism to provide a damping function.
7. A damper as defined in claim 6 wherein:
   the width of said post has a dimension that is substantially less than the length and the end of the post has a wedged shaped configuration.
8. A damper as defined in claim 7 wherein:
   said fluid is of a silicone composition.
9. A damped lever mechanism comprising:
   a lever beam mounted for pivotal movement about a pivotal axis, and
   pivotal damping means, including a flexible portion, secured to said lever beam so that the flexible portion of the damper means extends through the lever beam pivot axis wherein the pivot for the damping means corresponds to the pivot axis.
10. A mechanism as defined in claim 9 wherein said pivotal damping means includes:
    a rigid enclosure formed with a cavity and an opening into the cavity;
    a liquid contained within the cavity;
    a paddle extending through the opening into the liquid in the cavity, and
    a flexible seal extending from the opening in said enclosure supporting said paddle in said liquid, wherein said flexible portion provides a pivot for the damping means corresponding to the pivot axis.
11. A mechanism as defined in claim 10 wherein:
    said flexible seal supports the paddle at the end extending from the enclosure and allows for the expansion and contraction of the liquid within the cavity due to temperature changes.
12. A mechanism as defined in claim 11 comprising:
    attachment means on the end of said paddle for connecting said paddle to said lever beam to provide a damping function.
13. A mechanism as defined in claim 12 wherein:
    the mass of said paddle and its center of gravity of the paddle relative to said pivotal axis provides a static balance for the lever beam.
14. A mechanism as defined in claim 13 wherein:
    a compression seal is provided between said paddle and said flexible seal wherein the paddle can be rotated relative to the flexible seal.

* * * * *